United States Patent
Butzke et al.

(10) Patent No.: US 9,878,490 B2
(45) Date of Patent: Jan. 30, 2018

(54) LASER BEAM WELDING METHOD AND MOLDED COMPONENTS FABRICATED THEREBY

(75) Inventors: Jens Butzke, Chur (CH); Stefan Würthner, Domat/Ems (CH); Nikolai Lamberts, Bonaduz (CH); Pierre Dübon, Chur (CH); Sabine Bertram, Domat/Ems (CH); Heinz Caviezel, Masein (CH)

(73) Assignee: EMS-PATENT AG, Domat/Ems (CH)

(*) Notice: Subject to any disclaimer, the term of this patent is extended or adjusted under 35 U.S.C. 154(b) by 321 days.

(21) Appl. No.: 13/553,068

(22) Filed: Jul. 19, 2012

(65) Prior Publication Data
US 2013/0022766 A1 Jan. 24, 2013

(30) Foreign Application Priority Data
Jul. 21, 2011 (EP) .................................. 11174853

(51) Int. Cl.
*B29C 65/16* (2006.01)
*B29C 65/00* (2006.01)
*B29K 105/00* (2006.01)

(52) U.S. Cl.
CPC ...... *B29C 65/1616* (2013.01); *B29C 65/1635* (2013.01); *B29C 65/1654* (2013.01);
(Continued)

(58) Field of Classification Search
USPC ................ 156/272.8, 379.6, 380.9
See application file for complete search history.

(56) References Cited

U.S. PATENT DOCUMENTS

| 7,588,658 | B2 | 9/2009 | Yamamoto et al. | |
| 2003/0090562 | A1* | 5/2003 | Kubota | B23K 26/0648 347/241 |

(Continued)

FOREIGN PATENT DOCUMENTS

| JP | 2007-31491 A | 2/2007 |
| WO | 02/055287 A1 | 7/2002 |
| WO | 2009/000252 A2 | 12/2008 |
| WO | 2009/066232 A1 | 5/2009 |

OTHER PUBLICATIONS

A. Olowinsky, A. Boglea, "Extending the process limits of laser polymer welding with high-brilliance beam sources", Proc. SPIE 7921, Laser-based Micro- and Nanopackaging and Assembly V, 792107 (Feb. 21, 2011). http://proceedings.spiedigitallibrary.org/proceeding.aspx?articleid=720067.*

PolyBright Highlight, "High brilliance fiber laser sources with new wavelengths and enhanced optical power output", Mar. 8, 2011. http://www.polybrighteu/file_152767.dat.*

Nishikida, "Selected Applications of Modern FT-IR Techniques", CRC Press, Aug. 1, 1996, p. 260.*

J. Neukman, "Laser-Based Polymer Welding in Medical Device Manufacturing", Plastic Welding, Sep. 2009, 37-40.*

(Continued)

*Primary Examiner* — Michael N Orlando
*Assistant Examiner* — Elizabeth Bradford
(74) *Attorney, Agent, or Firm* — Sughrue Mion, PLLC (57) ABSTRACT

The invention relates to a method for laser welding two plastic components A, B brought into contact at least in the joining area, wherein component B facing away from the laser radiation consists of a plastic matrix with a white pigmentation of 1.5 5-20 wt.-%, and component A facing the laser radiation, through which the laser beam passes in the welding process, exhibits a plastic matrix. For a given laser wavelength the travel distance of the laser beam through the component A measures at most 10 mm, and given a white pigmentation of the component A in wt.-%, the product of the travel distance of the laser 10 beam through the component A in mm and white pigmentation in wt.-% is less than 1.25, and the travel distance of the laser beam through the component A measures at most 1 mm.

26 Claims, 1 Drawing Sheet

(52) U.S. Cl.
CPC ...... *B29C 65/1674* (2013.01); *B29C 66/1122* (2013.01); *B29C 66/305* (2013.01); *B29C 66/30223* (2013.01); *B29C 66/47* (2013.01); *B29C 66/472* (2013.01); *B29C 66/474* (2013.01); *B29C 66/7332* (2013.01); *B29C 66/7352* (2013.01); *B29C 66/836* (2013.01); *B29C 66/919* (2013.01); *B29C 66/9161* (2013.01); *B29C 66/929* (2013.01); *B29C 66/934* (2013.01); *B29C 66/939* (2013.01); *B29C 65/1638* (2013.01); *B29C 66/71* (2013.01); *B29C 66/7392* (2013.01); *B29C 66/73365* (2013.01); *B29C 66/73366* (2013.01); *B29C 66/73771* (2013.01); *B29C 66/73772* (2013.01); *B29C 66/73773* (2013.01); *B29C 66/73774* (2013.01); *B29C 66/73776* (2013.01); *B29C 66/73921* (2013.01); *B29K 2105/0032* (2013.01); *B29K 2105/0079* (2013.01); *B29K 2995/0026* (2013.01); *Y10T 428/1352* (2015.01); *Y10T 428/24851* (2015.01)

(56) References Cited

U.S. PATENT DOCUMENTS

2005/0228085 A1* 10/2005 Koshida et al. .......... 524/90
2009/0130451 A1   5/2009 Farrell
2010/0301022 A1  12/2010 Rickwood et al.

OTHER PUBLICATIONS

Dr. Sibylle Glaser, "Colorants and Special Additives for Laser Welding", Joining Plastics, Apr. 2006, pp. 1-5, XP-002665866.

Arno Bohm et al., "Laser-Kunststoffschweissen in Allen Farben", Technische Rundschau, 2004, pp. 28-31, vol. 23.

"Innovations in Laser Welding of Thermoplastics: This Advanced Technology is Ready to be Commercialized", BASF Corporation, 2002, XP-002665865.

* cited by examiner

LASER BEAM WELDING METHOD AND MOLDED COMPONENTS FABRICATED THEREBY

TECHNICAL AREA

The present invention relates to a method for the laser beam welding of thermoplastic components, in particular white-pigmented components. In addition, it relates to essentially white objects, which are assembled by laser beam welding thermoplastic molded components in this way.

PRIOR ART

In comparison to other joining techniques for plastics, laser beam welding offers a range of advantages, for example a low mechanical and locally limited thermal load placed on the molded components to be joined, and a high adaptability with respect to the welded seam geometry. In principle, the molded component facing the laser must be permeable to laser radiation, while the other molded component must absorb this radiation at a low penetration depth near the surface, and fuse at the location of the introduced radiation. Heat transfer then causes the molded component permeable to radiation to also fuse on the contact surface, resulting in a solid, adhesively joined composite after the cooling process. Prior art has a range of examples for laser beam welding plastic molded components in different color combinations. As known from the article "Laser Plastic Welding in all Colors" by Bohm et al., which appeared in 2004 in issue 23 of "Technische Rundschau" (Technical Review) (Swiss Professional Media AG, Wabern, Switzerland), the outstanding absorption properties of soot as a common black color pigment make the transparent/black molded component combination the best suited for laser beam welding. In addition, this article introduced additives with a high NIR absorption capacity, whose slight intrinsic coloration makes them suitable for use with transparent color shades. Adding NIR absorption enhancers in polymer compositions is known from prior art. For example, US-A-2009/0130451 presents a special laser beam weldable polymer composition, e.g., which contains lanthanum hexaboride or cesium tungsten oxide as the NIR absorption enhancer. Let it be explicitly noted that no laser beam weldable composition can be obtained without including these NIR absorbing additives, even in the presence of pigments. The extent to which the degree of whiteness is influenced by the additive in the process of white dying is not clear from the document.

In addition to the high costs for the described additives, the technical outlay associated with their use is also disadvantageous. In addition, the impression of whiteness is negatively affected by the intrinsic color of the additives.

WO-A-02/055287 discloses a special method for laser beam welding plastics, which provides an additional molded component between the two molded components to be joined. This additional molded component contains a layer with absorbing additives, and is at least partially fused by the laser radiation. After the melt has been cooled, a bond comes about between the molded components to be joined.

US-A-2010/0301022 discloses a method in which a laser absorbing dye is initially applied to a first substrate. After the first substrate has been brought into contact with a second substrate, these substrates can be joined together through laser beam welding due to the absorbing properties of the applied dye.

The white/white color combination is no less interesting to the consumer, and poses a special challenge. The high refraction index of white pigments, e.g., titanium dioxide, triggers a high scattering of the laser light. As a consequence, only a small portion, if any, of the introduced radiation can be converted into the thermal energy required to fuse the absorbing joining partner. For the reasons specified, WO-A-2009/000252 points out that titanium dioxide is essentially not suitable for use as a whitening agent in laser-based joining methods.

It is indeed true that components with a white pigmentation that are also actually visually perceived as being white are not permeable enough in practice when using conventional laser technology for laser welding. At the used laser wavelength of 980 nm, this inadequate permeability of such components results in a situation where the laser light is unable to penetrate through the overlying component and arrive at the joining site at all, which generally causes the laser light to be converted superficially on the overlying component, and there leads to a fusing that alters the surface, and frequently even to a black coloration, i.e., to a degradation of the polymer material.

DESCRIPTION OF THE INVENTION

Among other things, the object of the present invention is to provide a method for laser beam welding thermoplastic components, in particular white pigmented components. Specifically proposed is a method for laser welding two plastic components that are brought into contact at least in the joining area, hereinafter referred to as component A and component B, wherein component A faces the laser beam, and is penetrated by the latter during the welding process, and component B faces away from the laser beam.

The component (B) facing away from the laser radiation here consists of a plastic matrix with a white pigmentation of at least 0.5 percent by weight, particularly of at least 1.5 percent by weight, preferably of at least 3.5 percent by weight and even more preferably at least 5 percent by weight, and at most 20 percent by weight, particularly at most 15% percent by weight, and the component (A) facing the laser beam, through which the laser beam passes in the welding process, exhibits a plastic matrix. The plastic matrix can here preferably be transparent, but does not have to be. In addition, the component A can be unpigmented or exhibit a white pigmentation. Given a component A with white pigmentation, the latter preferably measures at least 0.01, particularly at least 0.3 percent by weight, preferably at least 0.5 percent by weight, and even more preferably at least 1 percent by weight. If the component A has a white pigmentation, the latter preferably measures at most 5 percent by weight, in particular preferably at most 3 percent by weight. According to the invention, welding is here performed using a laser wavelength ranging from 1200 to 2200 nm. Work preferably takes place within a wavelength range of 1400 to 2000 nm, especially preferably of 1440 to 1500 nm, and most preferably of 1440 to 1500 nm or 1910 to 1970 nm. As opposed to methods according to prior art, where such processes normally take place at a wavelength of 980 nm, it was found that higher wavelengths unexpectedly enable a successful welding process even if component (B) has a white pigmentation. One would in principle expect component (B) to become superficially damaged when exposed to laser radiation due to the white pigmentation, even if component (A) were to consist of an unpigmented material, and not that fusion would be sufficient to achieve a welded bond.

Just as unexpectedly, the process can be carried out even if the component (A) is pigmented.

The process must here be executed subject to the following conditions or provisos to be satisfied concurrently:
1) The travel distance (1) of the laser beam through the facing component (A) can measure at most 10 mm, regardless of whether it is unpigmented or pigmented. The travel distance (1) of the laser beam through the facing component (A) here preferably measures at most 7 mm, or at most 5 mm, especially preferably 3 mm;
2) At a white pigmentation of the component (A) expressed in percent by weight, the product of the travel distance (1) of the laser beam through the facing component (A) in mm and white pigmentation in percent by weight must be less than 1.25.

In other words, even if the component (A) facing the laser radiation is pigmented, the process can be executed successfully. However, a condition would then be that the pigmentation of the component (A) facing the laser radiation be deliberately set to somewhat lower than usual, but most preferably still at a level that ensures a visually white appearance. This is typically the case if the white pigmentation of the component (A) facing the laser radiation in percent by weight measures at least 0.05%, preferably at least 0.5%. As a result of the contrast, a high pigmentation of component (B) also increases the white impression left by component (A). Another condition is that the path of the laser through the component (A) facing the laser not be too long, i.e., that this path cannot be longer than 10 mm, and the product defined above must be <1.25, preferably less than <1.00, and most preferably less than <0.65. It was surprisingly found that, even though a visually adequate white effect is achieved, the laser does not superficially damage the component (A), enough of the laser passes through the component (A), and the welding site is heated sufficiently to ensure fusion and formation of the high-quality joining site. References made in this publication to white pigmentation in percent by weight must always be understood as the percentage share of weight relative to the total mass that yields a total of 100 percent of the component or affected region of the component. Both component (A) and component (B) can regionally be composed of different materials; if reference is subsequently made to component (A) or component (B), and the latter is defined, this refers at least to the area of the respective overall component affected by the laser joining process.

If the component (A) according to a first preferred embodiment of the proposed method exhibits a white pigmentation, the product of the travel distance (1) in mm and white pigmentation in percent by weight is most preferably less than 1, preferably less than <0.65, or ranges from 0.2 to 0.8, preferably from 0.2 to 0.6, especially preferably from 0.2 to 0.5.

Another preferred embodiment of the method is characterized in that the component (A) and/or component (B) is free of laser absorbing additives in the NIR range, and that no separate layers or coatings with such a material are situated between the components either. Component (A) and component (B) most preferably lie directly on top of each other at the joining site. It is especially preferred that both component (A) and component (B) be essentially free (i.e., typically having less than 0.0001 percent by weight), preferably completely free of laser absorbing additives in the NIR range. Another preferred embodiment of the method is characterized in that the laser beam is focused on the welded seam while implementing the method. In other words, the laser beam is preferably focused in the plane of the joining site, so as to at that location ensure the highest input power per unit volume.

In general, it is preferred that use be made of a laser power ranging from 2 to 500 W, especially preferably from 5 to 200 W. Further, it is generally preferred that work be performed at a feed rate ranging from 100 to 7000 mm/min. It is especially preferred that the used energy input per unit length range from 0.0005 to 0.05 J/m, preferably 0.0007 to 0.04 J/mm, and especially preferably from 0.0009 to 0.01 J/mm. The energy input per unit length is derived from the quotient of the laser power in W and the feed rate in mm/min, and the multiplication of the correction factor (60) obtained by recalculating the physical units.

During the process, the components are most preferably pressed against each other with a contact pressure ranging from 1 to 10 bar, preferably ranging from 2 to 5 bar.

As described above, the component (B) lying below, i.e., facing away from the laser, is provided with a white pigmentation. The latter preferably lies within a range of at least 3.5 percent by weight, preferably of at least 5 percent by weight, and normally at most at 20 percent by weight, preferably at most at 15 percent by weight.

The components are preferably both white, but at the very least the component (B) facing away from the laser. This must be taken to mean that component (B), and if present also component (A), or a corresponding molding compound if processed into a molded component with a smooth surface, exhibit a color effect in the LAB system that actually represents a white color appearance. This means that it is most preferable that $L^*>80$, preferable that $L^*>90$, especially preferable that $L^*>95$. Alternatively or additionally, the value of $a^*$ or respectively independent value of $b^*$ is most preferably <10, preferably <5, especially preferably <3, and eminently preferably around 0. $L^*$ values of >96 are especially preferred for the components. With respect to the component (B) facing away, it is regarded as preferred for it to be processed into a molded component with a smooth surface, and exhibit a color effect in the LAB system in which $L^*>90$, preferably $L^*>95$, and especially preferably $L^*>96$.

The proposed method essentially enables the realization of the following advantages:
  The welded objects are white, at least the portion of the object introduced from component (B),
  The addition of NIR absorption enhancers into the thermoplastic molding compounds or the presentation or application of absorption enhancers at the bonding site is not necessary, and no additional component containing an absorption enhancer must be introduced.

The components or molding compounds for use in the method according to the present invention can contain the thermoplastic polymers known to the expert as the polymer matrix, or essentially consist of polymers, except for the cited white pigmentation and the usual additives, such as flame retardants, additives for improving mechanical stability, and non IR absorbing additives. The list of examples includes, but is not limited to, acetal resins; liquid crystal polymers, polyacrylates, polymethacrylates; olefinic and cycloolefinic polymers; polyamides; polyamide elastomers, in particular polyester amides, polyether amides and polyether ester amides, polyamide imides, polyaryl ether containing polyphenyl ether; polycarbonates; polyethersulfones; polyetherimides, polyimides, polyesters; polyester polycarbonates; polyethers; polyoxyethylenes; polysterene; polysulfones; vinyl polymers such as polyvinyl chloride and polyvinyl acetate; or mixtures of one or more of the enumerated materials, containing ABS, MBS and SAN, PC, PMMA, etc.

The transparent, particularly amorphous polymers represent a preferred embodiment. As used in this publication, the term transparent thermoplastic polymers or transparent plastic matrix, in particular polyamides (i.e., transparent homopolyamide and/or copolyamide) is intended to denote polymers or plastic matrix systems, in particular polyamides or copolyamides or molding compounds made from the latter, whose light transmission measures at least 80%, in particular at least 90%, if the polymer or co(polyamide) (in pure form, i.e., without the other constituents of the molding compound indicated above) is present in the form of a platelet having a thickness of 2 mm.

Within the framework of this text, the value for light transmission is always to be understood as being determined according to the ASTM D1003 method (illuminant CIE-C). The light transmission was here measured in the experiments listed below using a device by the name of Haze Guard Plus from BYK Gardner (DE) on 70×2 mm round plates. The transmission value is indicated for the visible wavelength range as defined by CIE-C, i.e., at essential intensities of between approx. 400 and 770 nm. For example, the 70×2 mm round plates are fabricated for this purpose on an Arburg injection molding machine in a polished tool, wherein the cylinder temperature lies between 200 and 340° C., and the tool temperature between 20 and 140° C.

The turbidity (haze) of a plate fabricated out of the molding compound and having a thickness of 2 mm most preferably measures at most 5% (measured according to ASTM D1003 as specified above).

Another preferred embodiment involves partially crystalline polymers, which can also be successfully welded according to the method of the present invention. While the latter need not be transparent in the above sense, they can be.

In a preferred embodiment, the components or molded components used according to the invention contain polyamides or mixtures thereof, or preferably consist of such polyamides as the plastic matrix. These polyamides are here preferably obtained out of aliphatic, including cycloaliphatic, diamines and aromatic or aliphatic dicarbonic acids, or out of lactams. Especially preferably is the use of homo- and copolyamides formed out of cycloaliphatic C6-C17 diamines and/or aliphatic C4-C12 diamines with aliphatic C4-C20 dicarbonic acids and/or aromatic dicarbonic acids.

Special examples for dicarbonic acids include, but are not limited to, succinic acid, glutaric acid, adipic acid, dodecanoic diacid, brassylic acid, tetradecanoic diacid, pentadecanoic diacid, hexadecanoic diacid, heptadecanoic diacid, octadecanoic diacid, nonadecanoic diacid, 1,4-cyclohexane dicarbonic acid, eicosanoic diacid, naphthalene dicarbonic acid, terephthalic acid and isophthalic acid.

Preferable alternatives include polyamides, which consist of the aforementioned diamines and dicarbonic acids, as well as lactams with 4 to 15 C atoms and/or α,ω amino acids with 4 to 15 C atoms.

Special examples for diamines include, but are not limited to, hexamethylenediamine, heptamethylenediamine, octamethylenediamine, nonamethylenediamine, decamethylenediamine, undecamethylenediamine, dodecamethylenediamine, trimethylhexamethylenediamine, 2-methyl-1,5-pentanediamine, isophorone diamine, norbornane diamine, 1,3-bis(aminomethyl)cyclohexane, MACM, MXD, PACM, PXD and TMACM.

MACM stands for 3,3'-dimethyl-4,4'-diaminocyclohexylmethane, MXD stands for meta-xylylenediamine, PACM stands for 4,4'-diaminocyclohexylmethane, PXD stands for para-xylylenediamine and TMACM stands for 3,3',5,5'-tetramethyl-4,4'-diaminocyclohexylmethane.

In another preferred embodiment, the components according to the invention contain a transparent, amorphous polyamide comprised of MXD and terephthalic acid, or MXD and isophthalic acid.

Preferred transparent polyamides representing a constituent of the plastic matrix or essentially exclusively forming the latter (except for the usual additives in small percentages and any glass fibers that might be present) are selected from the following group: MACM9-18, PACM9-18, MACMI/12, MACMI/MACMT, MACMI/MACMT/12, 6I6T/MACMI/MACMT/12, 3-6T,616T, TMDT, 6I/MACMI/MACMT, 6I/PACMI/PACMT, 6I/6T/MACMI, MACMI/MACM36, 6I, 12/PACMI, MXDI/61 or 12/MACMT, 6/PACMT, 6/6I, 6/IPDT or mixtures thereof, wherein 50 mol. % of the IPS can be replaced by TPS.

In another preferred embodiment, the components according to the invention contain a partially crystalline polyamide, or consist of the latter as the plastic matrix. Examples include, but are not limited to, PA6, PA66, PA69, PA610, PA11, PA12, PA1010, PA1012, PA1210, and PA1212.

In another preferred embodiment, the components according to the invention contain a transparent, amorphous polyamide consisting of 3,3'-dimethyl-4,4'-diaminodicyclohexylmethane and decanoic diacid and/or dodecanoic diacid, wherein decanoic diacid and/or dodecanoic diacid can be replaced by up to 20% aromatic dicarbonic acids.

In another preferred embodiment, the components according to the invention contain a transparent, amorphous polyamide consisting of MACM and dodecanoic diacid (MACM12), wherein dodecanoic diacid can be replaced by up to 20% aromatic dicarbonic acids.

In the most preferred embodiment, the components according to the invention contain a transparent, amorphous polyamide comprised of 3,3'-dimethyl-4,4'-diaminodicyclohexylmethane and dodecanoic diacid, or are comprised of the latter as the plastic matrix (except for the usual additives in small percentages and any glass fibers that might be present).

The components according to the present invention further contain at least one white, essentially non-NIR absorbing pigment, for example aluminum oxide ($Al_2O_3$); barium sulfate ($BaSO_4$); lead carbonate ($PbCO_3$); calcium carbonate ($CaCO_3$); magnesium carbonate ($MgCO_3$); titanium dioxide ($TiO_2$); titanates, such as barium titanate ($BaTiO_3$), zinc oxide (ZnO); zinc sulfide (ZnS); mica; chalk; lithopone; silicon dioxide; silicates, such as aluminum silicate or sodium silicate; talc; metal-doted or coated variants of the mentioned materials or combinations that contain at least one of the mentioned materials. The above itemization is not limiting.

In a preferred embodiment, the white pigment is titanium dioxide in rutile or anatase form, zinc sulfide or chalk. In an especially preferred embodiment, the white pigment is titanium dioxide in rutile form. Traces (i.e., typically <0.2% w/w or <0.1% w/w) of other dyes that do not absorb in NIR can be contained in certain embodiments to adjust the color hue.

In an embodiment, the pigment has a median particle size of 0.1 to 0.5 micrometers (median particle size). In another embodiment, the white pigment titanium dioxide is in the rutile form, and has a median particle size of 0.15 to 0.30 micrometers. In a preferred embodiment, the white pigment titanium dioxide involves a rutile modification with a median particle size of 0.20 to 0.26 micrometers (median particle size).

Component A is at least partially transmissive for laser radiation. For example, it has a thickness of 0.1 to 5 mm, preferably of 0.2 to 1 mm, especially preferably ranging from 0.2 to 0.5 mm, eminently preferably ranging from 0.2 to 0.4 mm. Component B faces away from the laser radiation, and can at least partially absorb the latter. For example, component B has a thickness of 0.5 to 10 mm, preferably of 1 to 4 mm.

In the welding process, the laser radiation initially penetrates at least partially through component A, and is then essentially absorbed in component B in proximity to the surface and converted into heat. Component B fuses at the absorption site, and the transferred contact heat also causes component A to fuse at the interface. During the welding process, an outside contact pressure is preferably applied. A firm bond comes about after cooling at the latest.

The welded seam can here follow a straight line, but also exhibit any shape desired; it can be situated in a region where the two components (A) and (B) flatly adjoin each other, but can also be located in an area where a projection or rib of the one component comes to lie on a surface of the other component, for example, or in an area where two correspondingly arranged projections or ribs or even a groove and comb of the two components adjoin each other. Therefore, the welded seam can be both a spot welded seam, as well as a long, drawn out welded seam. A spot welded seam can be generated by a pulsed laser, for example.

The laser beam can be aimed perpendicular or at an angle different from zero relative to the plane normal for the surface of the component A.

The components according to the present invention can contain other additives known to the expert, which do not adversely influence the properties of the molded components, in particular with respect to interaction with the used wavelengths of the laser beam. The additive is preferably selected from the group consisting of inorganic stabilizers, organic stabilizers, lubricants, defoamers, chain-lengthening additives, optical brighteners that absorb in the UV range, softeners, adhesion promoters, halogen-containing flame retardants, particles, fillers and reinforcers, e.g., the latter in the form of fibers, or a combination of such additives.

One example for UV absorbing additives includes inorganic pigments or HALS (hindered amine light stabilizers), which act as UV stabilizers. Examples for these UV absorbing materials include, but are not limited to, benzophenone, benzotriazole, oxalanilides, phenyltriazine and tetramethylpiperidine derivatives.

These additives can be contained in amounts up to 2 percent by weight, preferably of up to 0.5, relative to 100 percent by weight of the thermoplastic molding compound. If the matrix material as the additive is also reinforced with glass fibers, higher percentages may be incorporated. For example, up to 50 percent by weight of glass fibers can preferably be added, or up to 30 percent by weight or up to 10 percent by weight. The glass fibers scan here exhibit a round cross section, or even a planar cross section, e.g., with a ratio between the axial lengths ranging from 2 to 10, preferably from 3 to 5. If the matrix material as the additive has also been modified in terms of impact strength, higher percentages can be incorporated. In this case, up to 30 percent by weight of impact strength improvers can preferably be added, or up to 20 percent by weight or up to 10 percent by weight. Furthermore, up to 2 percent by weight, preferably up to 1.2 percent by weight, of dyes that do not absorb in the NIR can be incorporated as other additives.

For example, the components can be manufactured in a polymerization process according to EP 0 725 101, wherein mixtures (blends) of various polymers can be used, and the components can be obtained via extrusion or injection molding. The polyamide molding compounds used according to the invention can be fabricated on conventional compounding machines, e.g., single- or twin-screw extruders or screw compounders. As a rule, the polymer portion is initially fused, and the pigment is introduced into the melt at any location of the extruder, e.g., by means of a side feeder. Compounding preferably takes place at set cylinder temperatures of 230° C. to 320° C. However, the polymer portion and pigment can also all be metered into the feeder.

While thickness is not all that significant in component (B), the latter typically lies within a range of less than 10 mm, or preferably less than 5 mm, for component (A); in a variant where component (A) exhibits a white pigmentation, the thickness is preferably at most 1 mm.

The welding strength (in terms of shear strength) during application of the used process typically measures at least 5 $N/mm^2$, preferably at least 10 $N/mm^2$, or at least 15 $N/mm^2$, and in particular preferably at least 20 $N/mm^2$. These values are here measured as described further below within the framework of the experimental tests.

For example, the objects of the present invention can be components for portable electrical devices, such as earphones, mobile phones and keys or objects used in medical technology. Correspondingly, the present invention also relates to components, in particular components from the area of portable electronic devices, in particular housings for a component selected form the following group: earphones, headphones, hearing aids, mobile phones, smart phones, portable computers, tablet computers, automobile keys, with at least one welded joint fabricated according to the method as described above.

The objects of the present invention can also be hoses provided with a connector or parts of a coffee maker with at least one welded joint according to the method as described above. Additional embodiments are indicated in the dependent claims.

BRIEF DESCRIPTION OF THE DRAWINGS

Preferred embodiments of the invention will be described in the following based on the drawings, which serve only an explanatory purpose, and are not to be construed as limiting. The drawings show.

DESCRIPTION OF PREFERRED EMBODIMENTS

Specific welding tests performed in the following experimental section will be used to document how the welding method can be implemented, and which mechanical properties can be guaranteed by the welded seam.

Figure 1:
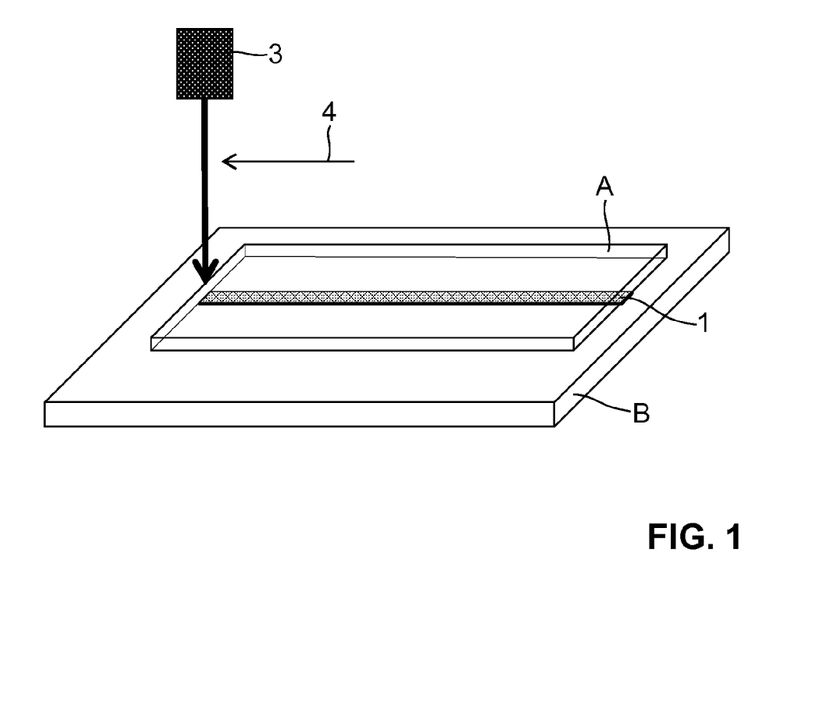
FIG. 1 a diagrammatic, perspective view of the laser welding process.

A method of the kind diagrammatically shown in a perspective view on FIG. 1 basically involves providing a component B that to some extent lies below and faces away from the laser beam, and bringing it into planar contact with another component A. A laser 3 emits a laser beam 2 focused on the contact plane of the two components, and travels along the desired welded seam 1 in a feed direction 4.

Figure 2:
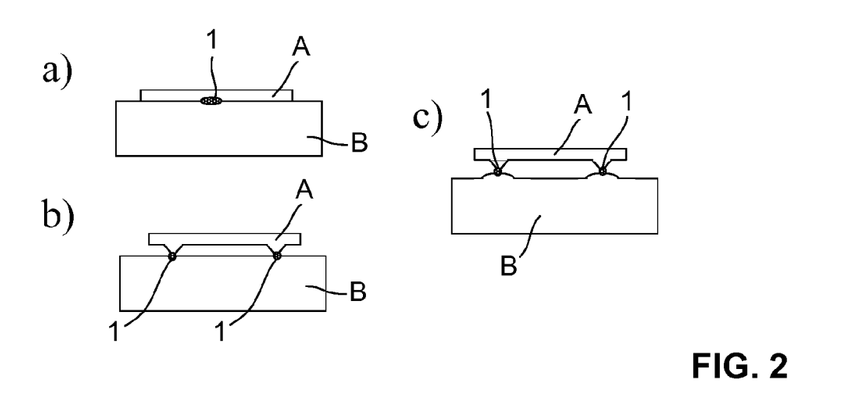
FIG. 2 sectional views perpendicular to the welded seam for different component shapes: a) planar contact region; b) rib contact via component A; c) rib contact for both components.

The contact areas between the components can also vary in design, as respectively depicted on FIG. 2 in sectional views perpendicular to the welded seam 1. FIG. 2a here shows the situation where the two components are in planar contact, as also depicted on FIG. 1. As evident from FIG. 2b, for example, component A can consist of ribs that establish contact with a surface of component B. A welded seam 1 can here also be correspondingly formed, provided that the wavelength of the laser through the material of the component A lies within the boundaries specified above. FIG. 2c presents a situation in which both components exhibit ribs, which run correspondingly; in this case, it is also possible, given a contact that is likewise to some extent linear, to form the welded seam 1 along this line. These figures present a respective linear welded seam, and the case can here involve a straight line or in principle any shape desired. This shape can be realized by guiding either the laser or the laser beam along this shape, or by keeping the beam stationary and moving the components accordingly. Also possible are spot welds, wherein these can also be realized by a correspondingly pulsed laser, for example.

Experimental Section

M12: Grilamid TR® 90 is an amorphous, transparent polyamide of type MACM12, with a light transmission of 93 and a haze of <1, available from EMS-CHEMIE AG P12: P12 is a partially crystalline polyamide of type PA12, available from EMS-CHEMIE AG LV3H: Grilamid® LV-3H is a glass fiber-reinforced, partially crystalline polyamide of type PA12, available from EMS-CHEMIE AG CX: Trogamid® CX7323 is an amorphous polyamide of type PACM12 with a light transmission of 93 and a haze of <1%, available from Evonik Degussa PMMA: Plexiglas® Resist zk40 is a polymethylmethacrylate (PMMA) with a light transmission of 90, available from Evonik Röhm GmbH PC: Makrolon® 2858 is a polycarbonate (PC) with a light transmission of 89, available from Bayer AG Ti-Pure® R103 is a white pigment made of $TiO_2$ in its rutile form available from DUPONT™, and has a median particle size of 23 micrometers (median particle size)

Kronos® 2220 is a white pigment made of $TiO_2$ in its rutile form available from Kronos®, and its surface is stabilized with aluminum and silicon compounds, as well as a silicone bond Sachtolith HDS is a white pigment made of zinc sulfide, available from Sachtleben Chemie GmbH.

The 0.5, 0.75 and 1 mm thick 4×5 cm plates used for the welding tests were injected out of these materials with a tempered tool on a fully electric injection molding machine from Arburg (device designation: ARBURG Allrounder 320 A 500-170). The following injection molding parameters were used.

a) For M12:
Tool 80° C., melt temperature 280° C.
b) For PC:
Tool 80° C., melt temperature 300° C.
c) For PMMA:
Tool 40° C., melt temperature 260° C.
d) For CX:
Tool 80° C., melt temperature 280° C.
e) For P12:
Tool 60° C., melt temperature 250° C.
f) For LV3H:
Tool 60° C., melt temperature 260° C.

Components (A) and (B) were cut to a length of 50 mm and a width of approx. 12 mm for the welding tests. Components (A) and (B) were dry welded.

The following diode lasers from DILAS Diodenlaser GmbH were used for the welding tests:

a) Wavelength: 1940 nm, COMPACT Diode Laser System 18/600 (16 W, 600 μm)

b) Wavelength: 1470 nm, MINI Diode Laser System 40/400 (40 W, 400 μm)

c) Wavelength: 980 nm, COMPACT Diode Laser System 500/400 (500 W, 400 μm)

Execution of Welding Tests:

The components (A) and (B) stored over a desiccant were placed one onto the other so as to overlap on a plate. A pneumatic plunger was actuated to press this plate against a PMMA plate fixed in place above it, which caused the contact pressure to build up. The laser beam was guided via a recess in the PMMA plate directly onto component A, and through the latter to the welded seam. The beam path or laser feed was manually adjusted at all wavelengths in such a way as to run through the entire width of component A. The energy input per unit length for the radiation is regulated via the feed, and was selected accordingly for the components to be welded. Depending on the chemical composition, thickness and pigment, the energy input per unit length should be specifically adjusted to avoid burning on the surface. A welding test was rated "−" in Tables 2 and 3 if either no bond was achieved between component A and B, or if component A exhibited burnt regions, holes or blisters. A welding test was rated (+) if a visual evaluation revealed no burnt regions or other damage to the surface.

The CIE L*a*b* values were determined on a spectrophotometer from Datacolor (device designation: Datacolor 650) under the following measuring principles in front of a contrast sheet that was painted white; mode of measurement: reflection; measuring geometry: D/8°; type of light: D 65 10; brightness: included; calibration: UV calibrated; measuring orifice: SAV. The obtained L*a*b* values are presented on Tables 1 to 3. The bond strength (welding strength) of the welded seam was determined according to ISO 527 with a traction speed of 5 mm/min at a temperature of 23° C. The overlapping welded objects consisting of components (A) and (B) were clamped into the traction engine in a dry state, and a force was applied parallel to the plate plane. The individual thickness of the components may be gleaned from Tables 1 to 3.

TABLE 1

Welding Tests with Molded Components made out of MACM12 and Ti-Pure ® R103 as the White Pigment

|  | VB1 | VB2 | B1 | B2 | B3 | B4 | B5 | B6 | VB3 | VB4 | B7 |
|---|---|---|---|---|---|---|---|---|---|---|---|
| Material | M12 | M12 | M12 | M12 | M12 | M12 | M12 | M12 | M12 | M12 | M12 |
| Component A $TiO_2$ [%] | 0 | 0 | 0 | 0 | 0 | 0 | 0 | 0 | 0 | 2.6 | 1.3 |
| Component B $TiO_2$ [%] | 0 | 0[a] | 1.3 | 1.3 | 5.2 | 5.2 | 5.2 | 5.2 | 5.2 | 5.2 | 5.2 |
| Thickness component A [mm] | 1 | 1 | 1 | 1 | 0.5 | 0.5 | 1 | 1 | 1 | 0.5 | 0.5 |
| Thickness component B [mm] | 1 | 1 | 1 | 1 | 0.75 | 0.75 | 1 | 1 | 1 | 0.75 | 0.75 |
| Laser wavelength [nm] | 1940 | 1940 | 1470 | 1940 | 1470 | 1940 | 1940 | 1470 | 98 | 1940 | 1940 |
| Energy input per unit length [J/mm] | 0.001 | 0.001 | 0.005 | 0.002 | 0.005 | 0.001 | 0.002 | 0.005 | 0.001 | 0.0009 | 0.001 |
| Contact pressure [bar] | 4 | 4 | 4 | 4 | 4 | 4 | 4 | 4 | 4 | 4 | 4 |
| Welding quality | + | + | + | + | + | + | + | + | − | − | + |
| Welding strength [N/mm$^2$] | n.d. | n.d. | 30.95 | 28.97 | 15.87 | 11.46 | n.d. | n.d. | − | − | 11.90 |
| L* value component A | n.d. | n.d. | n.d. | n.d. | n.d. | n.d. | n.d. | n.d. | n.d. | 95 | 95 |
| a* value component A | n.d. | n.d. | n.d. | n.d. | n.d. | n.d. | n.d. | n.d. | n.d. | −0.32 | −0.64 |
| b* value component A | n.d. | n.d. | n.d. | n.d. | n.d. | n.d. | n.d. | n.d. | n.d. | −0.18 | 0.58 |
| L* value component B | n.d. | n.d. | 96 | 96 | 96 | 96 | 96 | 96 | 96 | 96 | 96 |
| a* value component B | n.d. | n.d. | −0.52 | −0.52 | −0.35 | −0.35 | −0.14 | −0.14 | −0.14 | −0.35 | −0.35 |
| b* value component B | n.d. | n.d. | 0.90 | 0.90 | 0.00 | 0.00 | 0.33 | 0.33 | 0.33 | 0.00 | 0.00 |

[a] 50% glass fiber reinforced.
n.d. = not determined.

TABLE 2

Welding Tests with Molded Components made out of MACM12 and other white pigments

|  | B8 | B9 |
|---|---|---|
| Material | M12 | M12 |
| Component A white pigment [%] | 1.3 | 1.3 |
| Component B white pigment [%] | 5.2 | 5.2 |
| White pigment component A | Kronos 2220 | Sachtolith HD-S |
| White pigment component B | Ti-Pure ® R103 | Ti-Pure ® R103 |
| Thickness component A [mm] | 0.5 | 0.5 |
| Thickness component B [mm] | 0.75 | 0.75 |
| Laser wavelength [nm] | 1940 | 1940 |
| Energy input per unit length [J/mm] | 0.0012 | 0.0013 |
| Contact pressure [bar] | 4 | 4 |
| Welding quality | + | + |
| Welding strength [N/mm$^2$] | 15.43 | 9.26 |
| L* value component A | 95 | 96 |
| a* value component A | −0.07 | 0.02 |
| b* value component A | −0.41 | −0.77 |
| L* value component B | 96 | 96 |
| a* value component B | −0.35 | −0.35 |
| b* value component B | 0.00 | 0.00 |

TABLE 3

Welding Tests with Materials other than MACM12 and Ti-Pure ® R103 as the White Pigment

|  | B10 | B11 | B12 | B13 | B14 | B15 | B16 | B17 |
|---|---|---|---|---|---|---|---|---|
| Material | PC | PC | PMMA | P12[b] | P12[b] | P12[b] | LV-3H[a] | CX |
| Component A $TiO_2$ [%] | 0 | 0.5 | 0 | 0 | 0 | 0 | 0 | 0 |
| Component B $TiO_2$ [%] | 1.3 | 1.3 | 1.3 | 0 | 0 | 0 | 0 | 5.2 |
| Thickness component A [mm] | 1 | 1 | 1 | 0.5 | 0.75 | 0.75 | 0.75 | 1 |
| Thickness component B [mm] | 1 | 1 | 1 | 0.75 | 0.75 | 0.75 | 0.75 | 1 |
| Laser wavelength [nm] | 1470 | 1940 | 1470 | 1470 | 1470 | 1940 | 1940 | 1940 |
| Energy input per unit length [J/mm] | 0.001 | 0.005 | 0.008 | 0.006 | 0.008 | 0.018 | 0.002 | 0.002 |
| Contact pressure [bar] | 4 | 4 | 4 | 4 | 4 | 4 | 4 | 4 |
| Welding quality | + | + | + | + | + | + | + | + |
| Welding strength [N/mm$^2$] | 34.52 | 34.52 | 17.46 | 11.90 | 19.40 | 14.11 | 22.93 | 33.73 |
| L* value component A | n.d. | 92 | n.d. | n.d. | n.d. | n.d. | n.d. | n.d. |
| a* value component A | n.d. | −1.03 | n.d. | n.d. | n.d. | n.d. | n.d. | n.d. |
| b* value component A | n.d. | 1.02 | n.d. | n.d. | n.d. | n.d. | n.d. | n.d. |
| L* value component B | 94 | 94 | 95 | n.d. | n.d. | n.d. | n.d. | 96 |

TABLE 3-continued

Welding Tests with Materials other than MACM12 and Ti-Pure ® R103 as the White Pigment

|  | B10 | B11 | B12 | B13 | B14 | B15 | B16 | B17 |
|---|---|---|---|---|---|---|---|---|
| a* value component B | −0.79 | −0.79 | −0.81 | n.d. | n.d. | n.d. | n.d. | −0.52 |
| b* value component B | 0.63 | 0.63 | 2.16 | n.d. | n.d. | n.d. | n.d. | −0.90 |

[a]50% glass fiber reinforced.
[b]Partially crystalline.
n.d. = not determined.

| REFERENCE LIST | |
|---|---|
| 1 | Welded seam |
| 2 | Laser beam |
| 3 | Laser |
| 4 | Laser advancer |
| A | Facing component |
| B | Component facing away |

The invention claimed is:

1. A method for laser welding two plastic components, a first component and a second component, brought into contact at least in a joining area,
wherein the first component facing away from a laser radiation consists of a plastic matrix based on a thermoplastic polyamide with a white pigmentation of at least 0.5 percent by weight, and at most 20 percent by weight, and
wherein the second component facing the laser radiation, through which a laser beam of the laser radiation passes in the welding process, exhibits a plastic matrix based on a thermoplastic polyamide with a white pigmentation,
wherein a laser wavelength of said laser beam ranging from 1200 to 2200 nm is used for welding,
wherein, given a white pigmentation of the second component facing the laser radiation expressed in percent by weight, the product of the travel distance of said laser beam through said second component facing the laser radiation in mm and white pigmentation in percent by weight is less than 1.25, and that the travel distance of said laser beam through the second component facing the laser radiation measures at most 1 mm, and
wherein both the second component facing the laser radiation and the first component facing away from the laser radiation are essentially free of laser absorbing additives in the NIR range and wherein the joining site is not pretreated with an additive that absorbs in the NIR range, and no additional component that contains an additive that absorbs in the NIR range is incorporated between the component facing the laser radiation and the first component facing away from the laser radiation, and
wherein the method for laser welding leads to a welded bond without surface damage of the second component facing the laser radiation, through which a laser beam of the laser radiation passes in the welding process, and
wherein the first component facing away from a laser radiation consists of a plastic matrix based on a thermoplastic polyamide selected from the group consisting of MACM9-12, PACM9-18 and PA12 with a white pigmentation of at least 0.5 percent by weight, and at most 20 percent by weight,
and wherein the second component facing the laser radiation, through which a laser beam of the laser radiation passes in the welding process, exhibits a plastic matrix based on a thermoplastic polyamide selected from the group consisting of MACM9-12, PACM9-18 and PA12 with a white pigmentation of at least 0.5 percent by weight, and at most 5 percent by weight.

2. The method according to claim 1, wherein the product of travel distance in mm and white pigmentation of said second component in percent by weight is less than 1.

3. The method according to claim 1, wherein the laser beam is focused on the joining zone while implementing the method, and/or that a laser power of 2-40 W is used at a feed rate ranging from 100 to 7000 mm/min, wherein the energy input per unit length ranges from 0.0005 J/mm to 0.05 J/mm.

4. The method according to claim 1, wherein the components are pressed against each other during the process at a contact pressure ranging from 1 to 10 bar.

5. The method according to claim 1, wherein the first component facing away from the laser radiation exhibits a white pigmentation of at least 1 percent by weight, and at most 15 percent by weight.

6. The method according to claim 1, wherein, when processed into a molded component with a smooth surface, the second component facing the laser radiation exhibits a color effect in the CIE LAB system, at which L*>80, and/or the value of a* or respectively independent value of b* is <10, and/or that, when processed into a molded component with a smooth surface, the first component facing away exhibits a color effect in the LAB system, at which L*>90.

7. The method according to claim 1, wherein the white pigmentation of the first component and/or of the second component is adjusted based on at least one white pigment that does not absorb in NIR.

8. The method according to claim 1, wherein the used laser operates in a wavelength area of 1400 to 2000 nm.

9. The method according to claim 1, wherein the second component through which the laser beam passes in the welding process, and/or the first component facing away, exhibit a transparent plastic matrix, wherein the matrix in the unpigmented state exhibits a light transmission of at least 80%, if the polymer forming the plastic matrix is present in the form of a platelet having a thickness of 2 mm.

10. The method according to claim 1, wherein the second component facing the laser radiation exhibits a white pigmentation, and the product of travel distance in mm and white pigmentation in percent by weight is ranging from 0.2 to 0.8.

11. The method according to claim 1, wherein both the second component facing the laser radiation and the first component facing away from the laser radiation contain less than 0.0001 percent by weight of laser absorbing additives in the NIR range.

12. The method according to claim 1, wherein both the second component facing the laser radiation and the first component facing away from the laser radiation are completely free of laser absorbing additives in the NIR range.

13. The method according to claim 1, wherein the laser beam is focused on the joining zone while implementing the method, and/or that a laser power of 5-40 W, is used at a feed rate ranging from 100 to 7000 mm/min, wherein the energy input per unit length ranges from 0.0009 to 0.01 J/mm.

14. The method according to claim 1, wherein the components are pressed against each other during the process at a contact pressure ranging from 2 to 5 bar.

15. The method according to claim 1, wherein the first component facing away from the laser radiation exhibits a white pigmentation of at least 5 percent by weight, and at most 15 percent by weight.

16. The method according to claim 1, wherein, when processed into a molded component with a smooth surface, the second component facing the laser radiation exhibits a color effect in the CIE LAB system, at which L*>95, and/or the value of a* or respectively independent value of b* is <3, and/or that, when processed into a molded component with a smooth surface, the first component facing away exhibits a color effect in the LAB system, at which L*>96.

17. The method according to claim 1, wherein the white pigmentation of the first and second component is adjusted based on at least one white pigment that does not absorb in NIR, selected from the following group: aluminum oxide (Al2O3); barium sulfate (BaSO4); lead carbonate (PbCO3); calcium carbonate (CaCO3); magnesium carbonate (MgCO3); titanium dioxide (TiO2); titanates, such as barium titanate (BaTiO3), zinc oxide (ZnO); zinc sulfide (ZnS); mica; chalk; lithopone; silicon dioxide; aluminum silicate sodium silicate; talc; metal-doted or coated variants of the mentioned materials or combinations that contain at least one of the mentioned materials.

18. The method according to claim 1, wherein the white pigmentation of the first and second component is adjusted based on at least one white pigment that does not absorb in NIR, selected to be titanium dioxide, in its rutile form, used essentially exclusively for the white pigmentation.

19. The method according to claim 1, wherein the resulting welded seam exhibits a welding strength of at least 20 N/mm².

20. The method according to claim 1, wherein the second component through which the laser beam passes in the welding process, and/or the first component facing away, exhibit a transparent plastic matrix, wherein the matrix in the unpigmented state exhibits a light transmission of at least 90%, if the polyamide polymer forming the plastic matrix, is present in the form of a platelet having a thickness of 2 mm.

21. The method according to claim 1 wherein the laser power is ranging from 2 to 40 W.

22. The method according to claim 1, wherein the laser power is ranging from 5 to 40 W.

23. The method according to claim 1, wherein the energy input per unit length ranges from 0.0005 J/mm to 0.05 J/mm.

24. A method for laser welding two plastic components, a first component and a second component, brought into contact at least in a joining area,
wherein the first component facing away from a laser radiation consists of a plastic matrix based on a thermoplastic polyamide selected from the group consisting of MACM9-12, PACM9-18 and PA12 with a white pigmentation of at least 0.5 percent by weight, and at most 20 percent by weight, and
wherein the second component facing the laser radiation, through which a laser beam of the laser radiation passes in the welding process, exhibits a plastic matrix based on a thermoplastic polyamide selected from the group consisting of MACM9-12, PACM9-18 and PA12 with a white pigmentation of at least 0.5 percent by weight, and at most 5 percent by weight,
wherein a laser wavelength of said laser beam ranging from 1440 to 1500 nm or 1910 to 1970 nm is used for welding,
wherein, given a white pigmentation of the second component facing the laser radiation expressed in percent by weight, the product of the travel distance of said laser beam through said second component facing the laser radiation in mm and white pigmentation in percent by weight is less than 1.25, and that the travel distance of said laser beam through the second component facing the laser radiation measures at most 1 mm, and
wherein both the second component facing the laser radiation and the first component facing away from the laser radiation are essentially free of laser absorbing additives in the NIR range and wherein the joining site is not pretreated with an additive that absorbs in the NIR range, and no additional component that contains an additive that absorbs in the NIR range is incorporated between the component facing the laser radiation and the first component facing away from the laser radiation.

25. The method according to claim 24, wherein the resulting welded seam exhibits a welding strength of at least 5 N/mm².

26. A method for laser welding two plastic components, a first component and a second component, brought into contact at least in a joining area,
wherein the first component facing away from a laser radiation consists of a plastic matrix based on a thermoplastic polyamide with a white pigmentation of at least 0.5 percent by weight, and at most 20 percent by weight, and
wherein the second component facing the laser radiation, through which a laser beam of the laser radiation passes in the welding process, exhibits a plastic matrix based on a thermoplastic polyamide with a white pigmentation,
wherein a laser wavelength of said laser beam ranging from 1200 to 2200 nm is used for welding,
wherein, given a white pigmentation of the second component facing the laser radiation expressed in percent by weight, the product of the travel distance of said laser beam through said second component facing the laser radiation in mm and white pigmentation in percent by weight is less than 1.25, and that the travel distance of said laser beam through the second component facing the laser radiation measures at most 1 mm, and
wherein both the second component facing the laser radiation and the first component facing away from the laser radiation are essentially free of laser absorbing additives in the NIR range and wherein the joining site is not pretreated with an additive that absorbs in the NIR range, and no additional component that contains an additive that absorbs in the NIR range is incorporated between the component facing the laser radiation and the first component facing away from the laser radiation, and
wherein the method for laser welding leads to a welded bond without surface damage of the second component facing the laser radiation, through which a laser beam of the laser radiation passes in the welding process, and wherein the resulting welded seam exhibits a welding strength of at least 5 N/mm$^2$, wherein the first component facing away from a laser radiation consists of a plastic matrix based on a thermoplastic polyamide selected from the group consisting of MACM9-12, PACM9-18 and PA12 with a white pigmentation of at least 0.5 percent by weight, and at most 20 percent by weight, and wherein the second component facing the laser radiation, through which a laser beam of the laser radiation passes in the welding process, exhibits a plastic matrix based on a thermoplastic polyamide selected from the group consisting of MACM9-12, PACM9-18 and PA12 with a white pigmentation of at least 0.5 percent by weight, and at most 5 percent by weight.

* * * * *